(12) United States Patent
Brown

(10) Patent No.: US 7,658,670 B1
(45) Date of Patent: Feb. 9, 2010

(54) COMBINED WINDOW SCREEN AND VENTILATION SYSTEM FOR VEHICLES

(76) Inventor: Verrie M. Brown, 3308 Gladiolus La., Dallas, TX (US) 75233

( * ) Notice: Subject to any disclaimer, the term of this patent is extended or adjusted under 35 U.S.C. 154(b) by 797 days.

(21) Appl. No.: 11/389,449

(22) Filed: Mar. 27, 2006

(51) Int. Cl.
*B60J 1/20* (2006.01)
*B60J 7/22* (2006.01)
*B60H 1/00* (2006.01)
*F24F 9/00* (2006.01)

(52) U.S. Cl. ............... 454/128; 454/124; 454/129; 454/137; 454/189

(58) Field of Classification Search ............. 454/124, 454/128, 129, 136, 137, 162, 189
See application file for complete search history.

(56) References Cited

U.S. PATENT DOCUMENTS

| | | | |
|---|---|---|---|
| 1,594,377 A * | 8/1926 | Porter | 160/88 |
| 1,600,809 A * | 9/1926 | Durdin, Jr. | 160/37 |
| 2,150,110 A * | 3/1939 | Strauss et al. | 454/124 |
| 3,715,966 A * | 2/1973 | Miettinen | 454/124 |
| 4,331,359 A | 5/1982 | Sheldon | |
| 4,467,249 A | 8/1984 | Swearingen, Jr. | |
| 4,633,769 A * | 1/1987 | Milks | 454/117 |
| 4,800,803 A | 1/1989 | Farmont | |
| 4,881,456 A * | 11/1989 | Yasuda et al. | 454/75 |
| 5,121,038 A | 6/1992 | Yamamura et al. | |
| 5,165,188 A | 11/1992 | Tsiros | |
| 5,344,361 A * | 9/1994 | Matthias | 454/129 |
| 5,528,229 A * | 6/1996 | Mehta | 340/3.4 |
| D372,009 S | 7/1996 | Rocheford | |
| 5,591,078 A * | 1/1997 | Filion et al. | 454/124 |
| 5,765,635 A * | 6/1998 | Rhee | 165/203 |
| 6,186,886 B1 * | 2/2001 | Farrington et al. | 454/141 |
| 6,282,911 B1 * | 9/2001 | Watanabe et al. | 62/244 |
| 6,358,138 B1 * | 3/2002 | Alder | 454/124 |

FOREIGN PATENT DOCUMENTS

DE 3744500 A1 * 7/1989

* cited by examiner

*Primary Examiner*—Steven B McAllister
*Assistant Examiner*—Patrick F. O'Reilly, III

(57) ABSTRACT

A combined window-screen and ventilation system includes first and second non-corrosive conduits that are conjoined to the vehicle's existing air circulating system. The conduits are in fluid communication with the air circulating system such that air can flow therethrough. The conduits terminate rearward of a vehicle's front window and are provided with spaced apertures so that air is discharged towards side door window openings and a sunroof opening. Window screens are interfitted within the door window and the sunroof openings. A mechanism is included for circulating stagnant air within the vehicle. The air circulating mechanism is seated within the vehicle interior, is conjoined to the sunroof, is independently and contemporaneously operable with the vehicle air-circulating system, and is remotely operable up to 50 feet away, for example.

15 Claims, 6 Drawing Sheets

COMBINED WINDOW SCREEN AND VENTILATION SYSTEM FOR VEHICLES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to vehicle ventilation systems and, more particularly, to a combined window screen and ventilation system for vehicles.

2. Prior Art

Often, while driving down the highway or on a country road, a vehicle operator may wish to roll down their window and enjoy the airflow coming in therethrough. Unfortunately, a person is often prevented from doing so because of dirt, insects, and other debris that can enter the vehicle's interior while the windows are rolled down and the automobile is moving forward. Thus, the air-conditioning system must be employed, which greatly reduces the number of miles a vehicle can travel on one gallon of gas, also known as the vehicle's gas-mileage.

At other times, a vehicle may be parked at a stationary position with the windows rolled down because the occupants wish to have a constant supply of fresh air. This obviously requires that the vehicle's windows be rolled down in order to allow air to circulate therethrough. There are two disadvantages to this practice. One disadvantage being that, although dirt and debris are less likely to enter the vehicle's interior, insects and other organisms can still gain access to the automobile. Also, when parked with ones windows at a lowered position, you have no privacy. There is thus an obvious need for some form of window covering that can be employed independently of the vehicle's windows while the vehicle is stationary or traveling at various speeds.

A number of prior art applications show a covering of one sort or another that is independently operable to the vehicle's window for covering the opening when the window is at a retracted position. One prior art example shows a tinted plate that is suitably arranged for sliding in an orientation adjacent and coextensive with a vehicular window plate to provide for selective tinting of an associated door window. Such translucent tinted plate is mounted within the door below the window opening, adjacent to the existing window plate of the vehicular door. The disadvantage to such a tinted plate is that the solid nature thereof does not allow for air circulation therethrough when the plate is at the raised position.

Another prior art example shows a window shield that is formed of a penetration resistant material, which is positioned outside and adjacent to a standard glass window of an automobile or other vehicle. The window and shield are congruent and extend downwardly into a door panel through a pair of parallel, cushioned supporting channels. The window and shield are independently operated for vertical movement between open and closed positions. In the open position, the shield is retracted fully into the door panel; in the closed position, the shield is extended upwardly to enclose the access opening of the body. When closed, the upper and side edges of the window and shield are sealed to the body of the vehicle by a resilient gasket. This application has the same limitations and drawbacks of the previous example discussed herein above.

Accordingly, a need remains for a combined window screen and ventilation system for vehicles in order to overcome the above-noted shortcomings. The present invention satisfies such a need by providing a window screen ventilation system that is easy and convenient to use, provides the vehicle occupants with privacy when extended, and increases the user's comfort when employed. Instead of being subjected to flying insects and other debris while traveling the sturdy mesh screens intercept such projectiles while still allowing for sufficient air circulation through the interior of the vehicle. Such screens also prevent the vehicle from becoming stuffy and overheated while at a parked position, as would be the case with conventional windows. The combined window screen and ventilation system also advantageously prevents toddlers from sticking their appendages or upper body out of an open window, which otherwise could lead to serious injury or even death.

BRIEF SUMMARY OF THE INVENTION

In view of the foregoing background, it is therefore an object of the present invention to provide a combined window screen and ventilation system for vehicles. These and other objects, features, and advantages of the invention are provided by a combined window-screen system and ventilation system for controlling an interior temperature of a vehicle during operating and non-operating conditions.

The combined window-screen system and ventilation system includes first and second flexible tubular conduits that are directly conjoined to an existing air-conditioning and heating system of the vehicle. Such first and second conduits are formed from non-corrosive material. The first and second conduits are in fluid communication with the air-conditioning and heating system such that a controlled volume of air effectively flows through the first and second conduits at a selected rate. Such first and second conduits extend rearwardly from the air-conditioning and heating system wherein the first and second conduits terminate at an area located rearward of a front window of the vehicle.

The first and second conduits are provided with a plurality of spaced apertures formed therein such that a continuous and even flow of air is advantageously and conveniently discharged directly towards one of a plurality of side door window openings and a sunroof opening respectively. Each of the first and second conduits preferably includes an axial bore formed therein. Such axial bores are in fluid communication with the apertures. The apertures are positioned proximate to the window openings and the sunroof opening.

At least one of the first and second conduits may split into a pair of diverging portions at a location defined at the front windshield of the vehicle. Such diverging portions follow along an outer perimeter of the window openings respectively such that the apertures effectively become inwardly spaced along the perimeter of the window openings. The first and second conduits preferably further include a pair of auxiliary conduits that are directly and monolithically formed therewith respectively. Such auxiliary conduits are in fluid communication with the first and second conduits and are directly conjoined to an outer perimeter of the sunroof. Each auxiliary conduit is provided with a plurality of apertures for effectively and conveniently channeling air directly into the interior cavity of the vehicle.

A plurality of window screens are interfitted within the side door window openings and the sunroof opening respectively. Such window screens are formed from mesh material for advantageously and effectively allowing air to flow into an interior compartment of the vehicle. The mesh screens preferably cover an entire surface area of the window openings and the sunroof opening respectively.

A mechanism is included for conveniently and effectively circulating stagnant air housed within the interior of the vehicle. Such a stagnant air circulating mechanism is seated within the vehicle interior and is directly conjoined to the sunroof such that the stagnant air is quickly and effectively discharged out of the vehicle interior. The stagnant air circulating mechanism is independently and contemporaneously operable with the vehicle heating and air-conditioning system. Such a stagnant air circulating mechanism is conveniently remotely operable as well.

The stagnant air circulating mechanism preferably includes a housing that is directly attached to an interior surface of the sunroof. Such a housing has an outer edge contiguously extending about a perimeter of the sunroof and protruding downwardly therefrom wherein the housing terminates subjacent of the sunroof housing. The housing further has a central opening formed therein. Such a central opening is in fluid communication with ambient air and is further registered subjacent to a corresponding one of the window screens. A bottom mesh shield is directly connected to a bottom edge of the housing. Such a mesh shield is formed from porous material to thereby effectively allow the stagnant air to upwardly pass through the housing and out of the sunroof.

An internal power supply source is nested within the housing. A motor includes a drive shaft that has a multi-blade fan directly coupled thereto. Such a motor is electrically coupled to the internal power supply source and further is selectively operable between clockwise and counter-clockwise directions for advantageously venting stagnant air and effectively introducing ambient air directly into the vehicle interior. The multi-blade fan is registered above the mesh shield. A static control unit is nested within the housing and is electrically coupled to the motor. A portable control unit generates and transmits a wireless RF signal to the static control unit based upon a user input. The control unit generates and sends a control signal to the motor based upon instructions received from the wireless RF signal for manipulating an operating mode of the motor. The portable control unit is capable of transmitting the wireless RF signal up to 50 feet away, for example. Of course, one skilled in the art would understand the portable control unit can be modified with an amplifier or upgraded transmitter that is capable of transmitting stronger RF signals from greater distances without affecting the true scope and spirit of the present invention.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
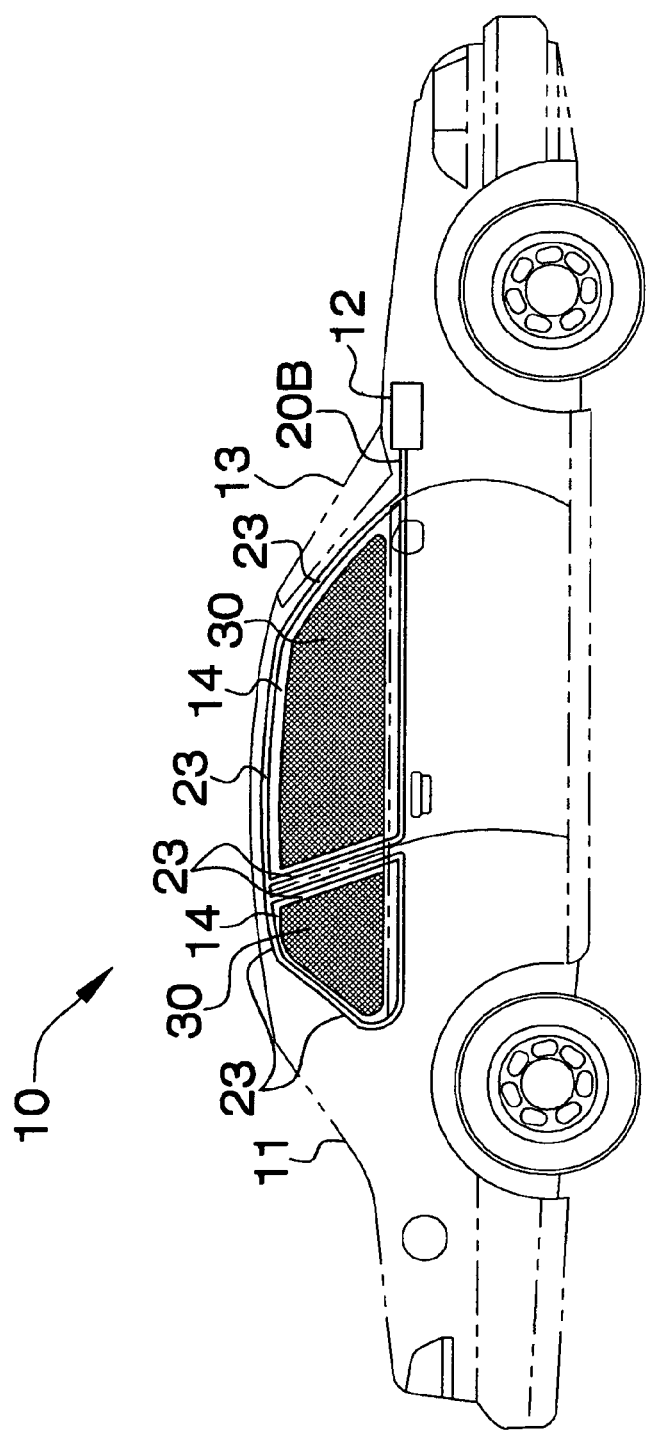
FIG. 1 is a side-elevational view showing a combined window screen and ventilation system for vehicles, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-7 by the reference numeral 10 and is intended to provide a combined window screen and ventilation system for vehicles. It should be understood that the system 10 may be used to provide circulation for many different types of vehicles and should not be limited in use to only four door passenger type vehicles.

Referring initially to FIGS. 1, 2, 3, 4 and 7, the system 10 includes first 20A and second 20B flexible tubular conduits that are directly conjoined, without the use of intervening elements, to an existing air-conditioning and heating system 12 of the vehicle 11. Such first 20A and second 20B conduits are formed from non-corrosive material, which is important and advantageous for preventing the conduits 20 from being adversely affected by various ambient conditions. The first 20A and second 20B conduits are in fluid communication with the air-conditioning and heating system 12, which is essential such that a controlled volume of air effectively flows through the first 20A and second 20B conduits at a selected rate.

Again referring to FIGS. 1, 2, 3, 4 and 7, such first 20A and second 20B conduits extend rearwardly from the air-conditioning and heating system 12 wherein the first 20A and second 20B conduits terminate at an area located rearward of a front window 13 of the vehicle 11. The first 20A and second 20B conduits are provided with a plurality of spaced apertures 21 formed therein, which is crucial such that a continuous and even flow of air is advantageously and conveniently discharged directly towards one of a plurality of side door window openings 14 and a sunroof opening 15 respectively.

Each of the first 20A and second 20B conduits includes an axial bore 22 formed therein. Such axial bores 22 are in fluid communication with the apertures 21. The apertures 21 are positioned proximate to the window openings 14 and the sunroof opening 15. Of course, the travel path of the first 20A and second 20B conduits may be altered depending on the already present structural obstacles of the vehicle 11 in which the system 10 is installed, as is obvious to a person of ordinary skill in the art.

Figure 2:
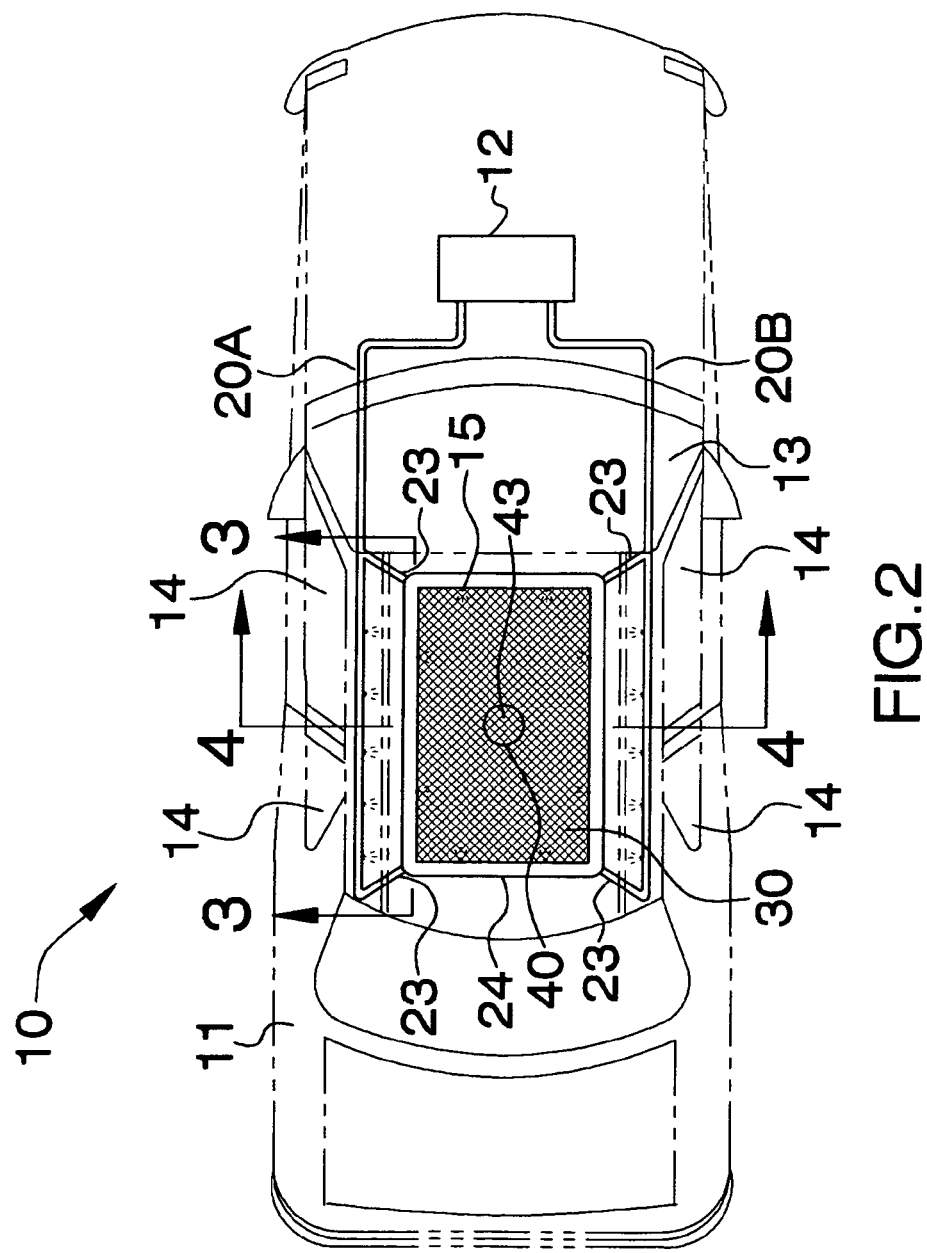
FIG. 2 is a top plan view of the system shown in FIG. 1.
Figure 3:
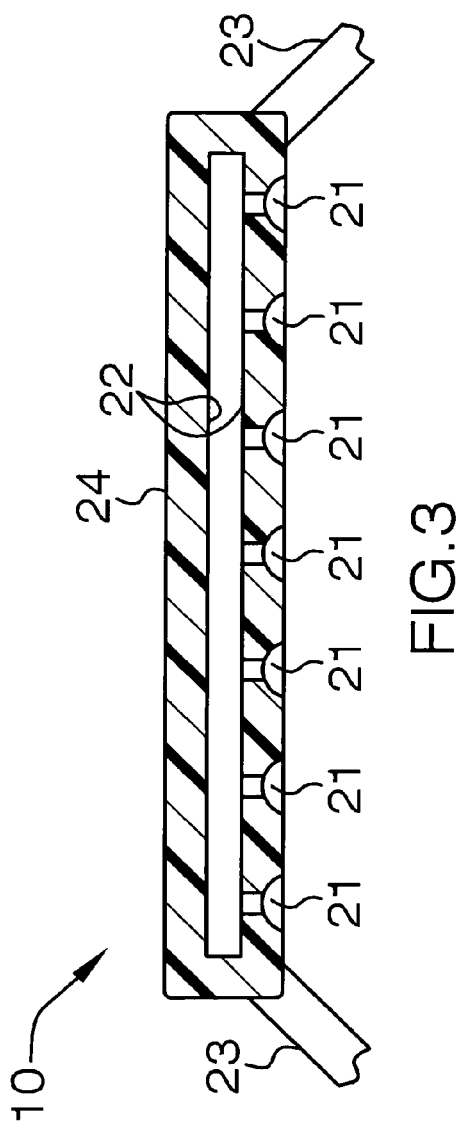
FIG. 3 is cross-sectional view of the system shown in FIG. 2, taken along line 3-3.
Figure 7:
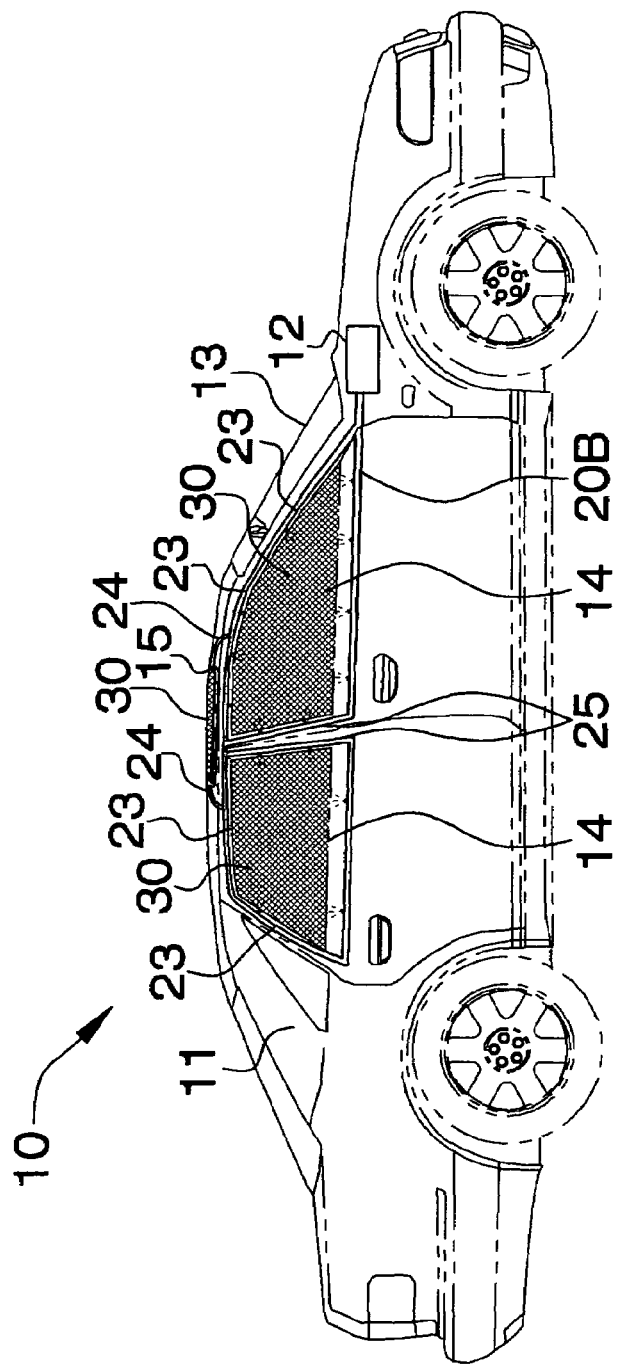
FIG. 7 is a side-elevational view of the system shown in FIG. 1, showing the addition of the sunroof screen.

Referring to FIGS. 1, 2 and 7, at least one of the first 20A and second 20B conduits splits into a pair of diverging portions 23 at a location defined at the front windshield 13 of the vehicle 11. Such diverging portions 23 follow along an outer perimeter of the window openings 14 respectively, which is important such that the apertures 21 effectively become inwardly spaced along the perimeter of the window openings. The first 20A and second 20B conduits further include a pair of auxiliary conduits 24 that are directly and monolithically formed therewith respectively. Such auxiliary conduits 24 are in fluid communication with the first 20A and second 20B conduits and are directly conjoined, without the use of intervening elements, to an outer perimeter of the sunroof 15. Each auxiliary conduit 24 is provided with a plurality of apertures 21 that are vital for effectively and conveniently channeling air directly into the interior cavity of the vehicle 11.

Referring to FIGS. 1, 2, 4, 5 and 7, a plurality of window screens 30 are interfitted within the side door window openings 14 and the sunroof opening 15 respectively. Such window screens 30 are formed from mesh material, which is a critical feature for advantageously and effectively allowing air to flow into an interior compartment of the vehicle 11. The mesh screens cover 30 an entire surface area of the window openings 14 and the sunroof opening 15 respectively. Of course, such window screens 30 may be produced in a variety of alternate shapes and sizes for effectively covering the entire window 14 and sunroof 15 surface areas of various car brands and the plethora of models produced by each vehicle brand, as is obvious to a person of ordinary skill in the art.

Figure 4:
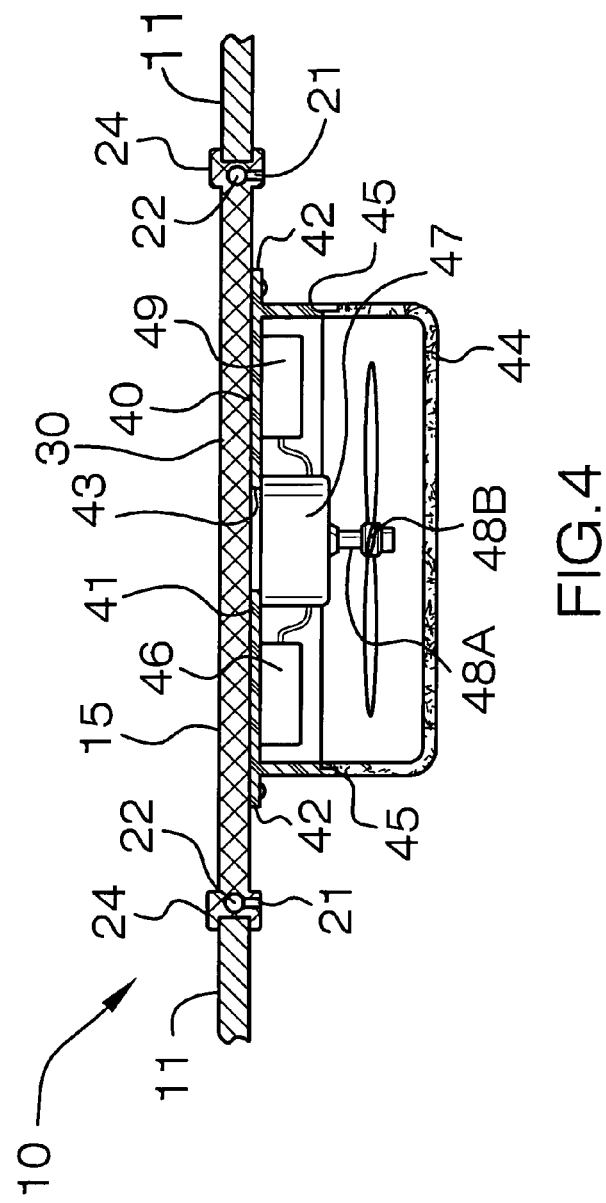
FIG. 4 is a cross-sectional view of the apparatus shown in FIG. 2, taken along line 4-4.
Figure 5:
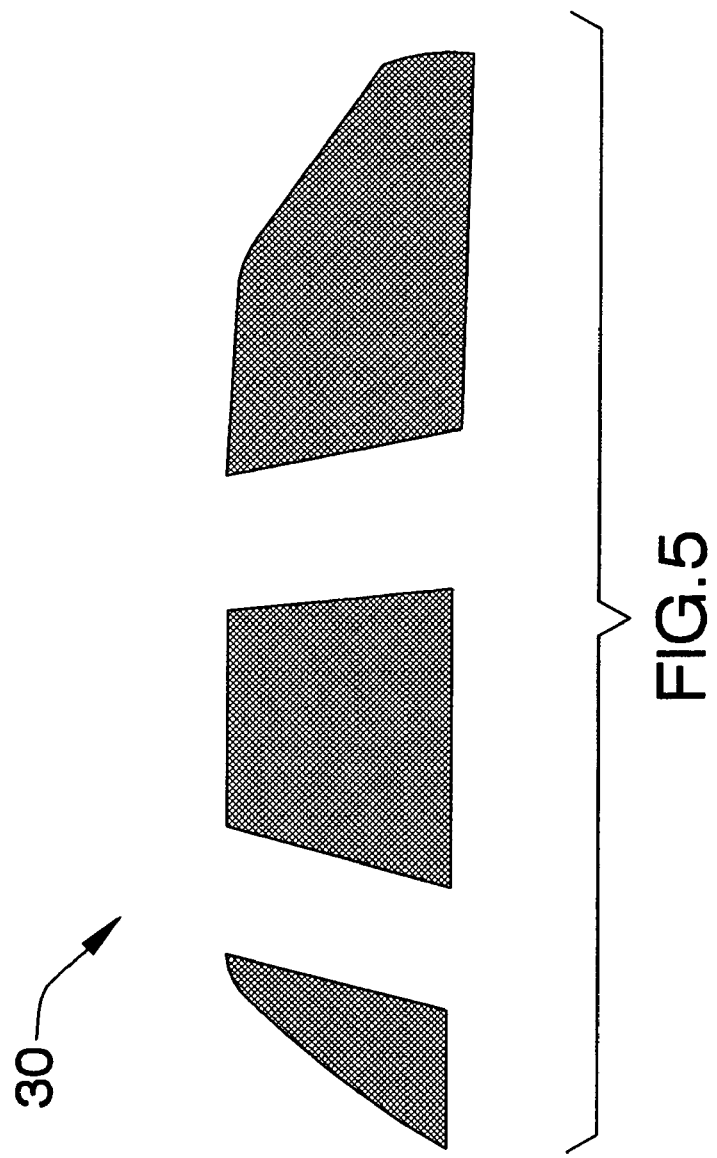
FIG. 5 is an enlarged side-elevational view of the window screen shown in FIG. 1.

Referring to FIG. 4, a mechanism 40 is included for conveniently and effectively circulating stagnant air housed within the interior of the vehicle 11. Such a stagnant air circulating mechanism 40 is seated within the vehicle interior and is directly conjoined, without the use of intervening elements, to the sunroof 15 such that the stagnant air is quickly and effectively discharged out of the vehicle interior. Of course, such a stagnant air circulating mechanism 40 may be positioned at any other suitable location, as is obvious to a person of ordinary skill in the art. The stagnant air circulating mechanism 40 is independently and contemporaneously operable with the vehicle heating and air-conditioning system 12. Such a stagnant air circulating mechanism 40 is conveniently remotely operable as well. This is an important and advantageous feature for allowing a user to ventilate a vehicle prior to entering the interior thereof and for allowing pets to remain within the closed, yet ventilated, vehicle 11 for short periods of time without becoming dehydrated and possibly dying.

Referring to FIGS. 2 and 4, the stagnant air circulating mechanism 40 includes a housing 41 that is directly attached, without the use of intervening elements, to an interior surface of the sunroof 15. Such a housing 41 has an outer edge 42 contiguously extending about a perimeter of the sunroof 15 and protruding downwardly therefrom wherein the housing 41 terminates subjacent of the sunroof housing 15. The housing 41 further has a central opening 43 formed therein. Such a central opening 43 is in fluid communication with ambient air and is further registered subjacent to a corresponding one of the window screens 30. A bottom mesh shield 44 is directly connected, without the use of intervening elements, to a bottom edge 45 of the housing 41. Such a mesh shield 44 is formed from porous material, which is important to thereby effectively allow the stagnant air to upwardly pass through the housing 41 and out of the sunroof 15.

Figure 6:
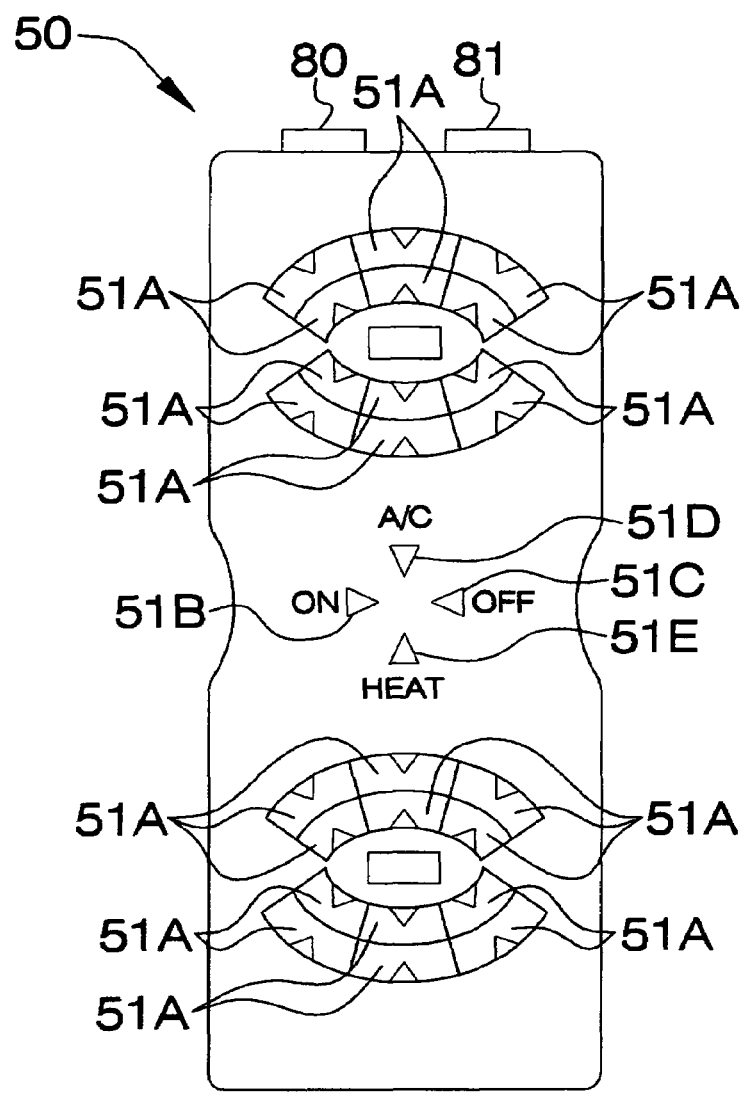
FIG. 6 is a top plan view of the portable control unit, in accordance with the present invention.

Referring to FIGS. 4 and 6, an internal power supply source 46 is nested within the housing 41. A motor 47 includes a drive shaft 48A that has a multi-blade fan 48B directly coupled thereto, without the use of intervening elements. Such a motor 47 is electrically coupled to the internal power supply source 46 and further is selectively operable between clockwise and counter-clockwise directions, which is crucial and advantageous for venting stagnant air and effectively introducing ambient air directly into the vehicle interior. The multi-blade fan 48B is registered above the mesh shield 44.

A static control unit 49 is nested within the housing 41 and is electrically coupled to the motor 47. A portable control unit 50 generates and transmits a wireless RF signal to the static control unit 49 based upon a user input. The control unit 49 generates and sends a control signal to the motor 47 based upon instructions received from the wireless RF signal for manipulating an operating mode of the motor 47. The portable control unit 50 includes a plurality of buttons 51 that are vital for allowing the user to effectively and conveniently alter the operating mode of the system 10 from a remote location. The buttons 51 includes the types of ARROW buttons 51A for raising and retracting the screens 30, an ON button 51B and OFF button 51C for effectively toggling the system 10 between operating and non-operating modes, and an A/C button 51D and HEAT button 51E for toggling the system 10 between cooling and heating modes, respectively. Buttons 80 and 81 provide separate controls for independently and simultaneously controlling the front and rear windows, respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A combined window-screen system and ventilation system for controlling an interior temperature of a vehicle during operating and non-operating conditions, said combined window-screen system and ventilation system comprising:

first and second flexible tubular conduits directly conjoined to an existing air-conditioning and heating system of the vehicle, said first and second conduits being in fluid communication with the air-conditioning and heating system such that a controlled volume of air flows through said first and second conduits at a selected rate, said first and second conduits extending rearwardly from the air-conditioning and heating system wherein said first and second conduits terminate at an area located rearward of a front window of the vehicle, said first and second conduits being provided with a plurality of spaced apertures formed therein such that a continuous and even flow of air is discharged directly towards one of a plurality of side door window openings and a sunroof opening respectively;

a plurality of window screens interfitted within the side door window openings and the sunroof opening respectively, said window screens being formed from mesh material for allowing air to flow into an interior compartment of the vehicle; and means for circulating stagnant air housed within the interior of the vehicle, said stagnant air circulating means being seated within the vehicle interior and directly conjoined to the sunroof such that the stagnant air is quickly and effectively discharged out of the vehicle interior, wherein said stagnant air circulating means is independently and contemporaneously operable with the vehicle heating and air-conditioning system;

wherein said first and second conduits comprise: a pair of auxiliary conduits directly and monolithically formed therewith respectively, said auxiliary conduits being in fluid communication with said first and second conduits and directly conjoined to an outer perimeter of the sunroof, each of said auxiliary conduits being provided with a plurality of apertures for channeling air directly into the interior cavity of the vehicle.

2. The system of claim 1, wherein said stagnant air circulating means comprises:

a housing directly attached to an interior surface of the sunroof, said housing having an outer edge contiguously extending about a perimeter of the sunroof and protruding downwardly therefrom wherein said housing terminates subjacent of the sunroof housing, said housing further having a central opening formed therein, said central opening being in fluid communication with ambient air and further being registered subjacent a corresponding one of said window screens;

a bottom mesh shield directly connected to a bottom edge of said housing, said mesh shield being formed from porous material to thereby allow the stagnant air to upwardly pass through said housing and out of the sunroof;

an internal power supply source nested within said housing;

a motor including a drive shaft and a multi-blade fan directly coupled thereto, said motor being electrically coupled to said internal power supply source and further being selectively operable between clockwise and counter-clockwise directions for venting stagnant air and introducing ambient air directly into the vehicle interior, said multi-blade fan being registered above said mesh shield;

a static control unit nested within said housing and electrically coupled to said motor; and a portable control unit generating and transmitting a wireless RF signal to said static control unit based upon a user input, said control unit generating and sending a control signal to said motor based upon instructions received from said wireless RF signal for manipulating an operating mode of said motor.

3. The system of claim 1, wherein each of said first and second conduits include an axial bore formed therein, said axial bores being in fluid communication with said apertures, said apertures being positioned proximate to the window openings and the sunroof opening.

4. The system of claim 1, wherein said mesh screens cover an entire surface area of the window openings and the sunroof opening respectively.

5. The system of claim 1, wherein at least one of said first and second conduits splits into a pair of diverging portions at a location defined at the front window of the vehicle, said diverging portions following along an outer perimeter of the side door window openings respectively such that said apertures become inwardly spaced along the perimeter of the side door window openings.

6. A combined window-screen system and ventilation system for controlling an interior temperature of a vehicle during operating and non-operating conditions, said combined window-screen system and ventilation system comprising:

first and second flexible tubular conduits directly conjoined to an existing air-conditioning and heating system of the vehicle, said first and second conduits being in fluid communication with the air-conditioning and heating system such that a controlled volume of air flows through said first and second conduits at a selected rate, said first and second conduits extending rearwardly from the air-conditioning and heating system wherein said first and second conduits terminate at an area located rearward of a front window of the vehicle, said first and second conduits being provided with a plurality of spaced apertures formed therein such that a continuous and even flow of air is discharged directly towards one of a plurality of side door window openings and a sunroof opening respectively;

a plurality of window screens interfitted within the side door window openings and the sunroof opening respectively, said window screens being formed from mesh material for allowing air to flow into an interior compartment of the vehicle; and means for circulating stagnant air housed within the interior of the vehicle, said stagnant air circulating means being seated within the vehicle interior and directly conjoined to the sunroof such that the stagnant air is quickly and effectively discharged out of the vehicle interior, wherein said stagnant air circulating means is independently and contemporaneously operable with the vehicle heating and air-conditioning system, wherein said stagnant air circulating means is remotely operable;

wherein said mesh screens cover an entire surface area of the side door window openings and the sunroof opening respectively.

7. The system of claim 6, wherein said stagnant air circulating means comprises:

a housing directly attached to an interior surface of the sunroof, said housing having an outer edge contiguously extending about a perimeter of the sunroof and protruding downwardly therefrom wherein said housing terminates subjacent of the sunroof housing, said housing further having a central opening formed therein, said central opening being in fluid communication with ambient air and further being registered subjacent a corresponding one of said window screens;

a bottom mesh shield directly connected to a bottom edge of said housing, said mesh shield being formed from porous material to thereby allow the stagnant air to upwardly pass through said housing and out of the sunroof;

an internal power supply source nested within said housing;

a motor including a drive shaft and a multi-blade fan directly coupled thereto, said motor being electrically coupled to said internal power supply source and further being selectively operable between clockwise and counter-clockwise directions for venting stagnant air and introducing ambient air directly into the vehicle interior, said multi-blade fan being registered above said mesh shield;

a static control unit nested within said housing and electrically coupled to said motor; and a portable control unit generating and transmitting a wireless RF signal to said static control unit based upon a user input, said control unit generating and sending a control signal to said motor based upon instructions received from said wireless RF signal for manipulating an operating mode of said motor.

8. The system of claim 6, wherein each of said first and second conduits include an axial bore formed therein, said axial bores being in fluid communication with said apertures, said apertures being positioned proximate to the window openings and the sunroof opening.

9. The system of claim 6, wherein at least one of said first and second conduits splits into a pair of diverging portions at a location defined at the front window of the vehicle, said diverging portions following along an outer perimeter of the side door window openings respectively such that said apertures become inwardly spaced along the perimeter of the side door window openings.

10. The system of claim 6, wherein said first and second conduits comprise:

a pair of auxiliary conduits directly and monolithically formed therewith respectively, said auxiliary conduits being in fluid communication with said first and second conduits and directly conjoined to an outer perimeter of the sunroof, each of said auxiliary conduits being provided with a plurality of apertures for channeling air directly into the interior cavity of the vehicle.

11. A combined window-screen system and ventilation system for controlling an interior temperature of a vehicle during operating and non-operating conditions, said combined window-screen system and ventilation system comprising:

first and second flexible tubular conduits directly conjoined to an existing air-conditioning and heating system of the vehicle, wherein said first and second conduits are formed from non-corrosive material, said first and second conduits being in fluid communication with the air-conditioning and heating system such that a controlled volume of air flows through said first and second conduits at a selected rate, said first and second conduits extending rearwardly from the air-conditioning and heating system wherein said first and second conduits terminate at an area located rearward of a front window of the vehicle, said first and second conduits being provided with a plurality of spaced apertures formed therein such that a continuous and even flow of air is discharged directly towards one of a plurality of side door window openings and a sunroof opening respectively;

a plurality of window screens interfitted within the side door window openings and the sunroof opening respectively, said window screens being formed from mesh material for allowing air to flow into an interior compartment of the vehicle; and means for circulating stagnant air housed within the interior of the vehicle, said stagnant air circulating means being seated within the vehicle interior and directly conjoined to the sunroof such that the stagnant air is quickly and effectively discharged out of the vehicle interior, wherein said stagnant air circulating means is independently and contemporaneously operable with the vehicle heating and air-conditioning system, wherein said stagnant air circulating means is remotely operable;

wherein at least one of said first and second conduits splits into a pair of diverging portions at a location defined at the front window of the vehicle, said diverging portions following along an outer perimeter of the side door window openings respectively such that said apertures become inwardly spaced along the perimeter of the side door window openings.

12. The system of claim 11, wherein said stagnant air circulating means comprises:

a housing directly attached to an interior surface of the sunroof, said housing having an outer edge contiguously extending about a perimeter of the sunroof and protruding downwardly therefrom wherein said housing terminates subjacent of the sunroof housing, said housing further having a central opening formed therein, said central opening being in fluid communication with ambient air and further being registered subjacent a corresponding one of said window screens;

a bottom mesh shield directly connected to a bottom edge of said housing, said mesh shield being formed from porous material to thereby allow the stagnant air to upwardly pass through said housing and out of the sunroof;

an internal power supply source nested within said housing;

a motor including a drive shaft and a multi-blade fan directly coupled thereto, said motor being electrically coupled to said internal power supply source and further being selectively operable between clockwise and counter-clockwise directions for venting stagnant air and introducing ambient air directly into the vehicle interior, said multi-blade fan being registered above said mesh shield;

a static control unit nested within said housing and electrically coupled to said motor; and a portable control unit generating and transmitting a wireless RF signal to said static control unit based upon a user input, said control unit generating and sending a control signal to said motor based upon instructions received from said wireless RF signal for manipulating an operating mode of said motor.

13. The system of claim 11, wherein each of said first and second conduits include an axial bore formed therein, said axial bores being in fluid communication with said apertures, said apertures being positioned proximate to the window openings and the sunroof opening.

14. The system of claim 11, wherein said mesh screens cover an entire surface area of the window openings and the sunroof opening respectively.

15. The system of claim 11, wherein said first and second conduits comprise:

a pair of auxiliary conduits directly and monolithically formed therewith respectively, said auxiliary conduits being in fluid communication with said first and second conduits and directly conjoined to an outer perimeter of the sunroof, each of said auxiliary conduits being provided with a plurality of apertures for channeling air directly into the interior cavity of the vehicle.

* * * * *